Feb. 18, 1964   C. D. BAUER ETAL   3,121,639
SPRAY DRYING PROCESS
Filed Oct. 19, 1960
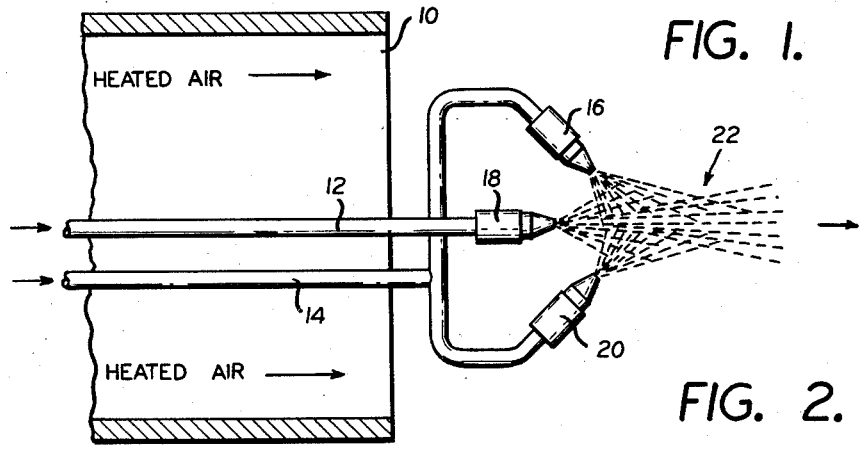
FIG. 1.
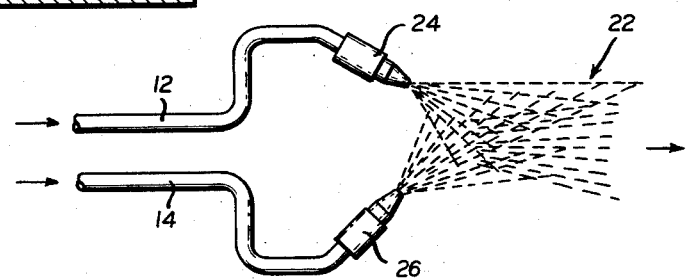
FIG. 2.
FIG. 3.
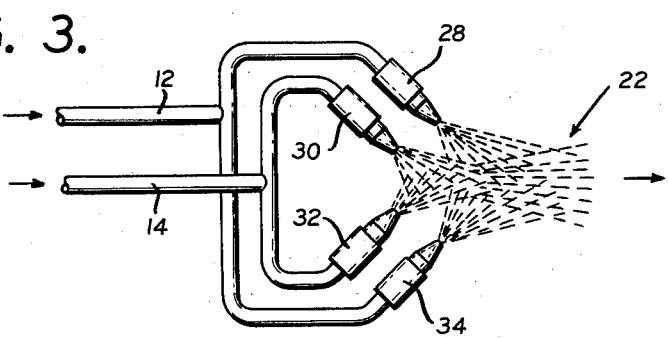
FIG. 4.
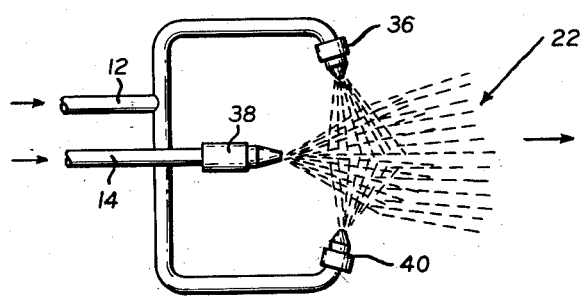
INVENTORS
CLIFFORD D. BAUER
ROBERT M. MARKS
BY
ROBERT CALVERT
ATTORNEY

United States Patent Office 3,121,639
Patented Feb. 18, 1964

3,121,639
SPRAY DRYING PROCESS
Clifford D. Bauer and Robert M. Marks, Elgin, Ill., assignors, by mesne assignments, to Dairy Foods Incorporated, Oakland, Calif., a corporation of California
Filed Oct. 19, 1960, Ser. No. 63,525
4 Claims. (Cl. 99—203)

This invention relates to spray drying. It is particularly useful in making an improved infant food powder and will be first illustrated by description in connection therewith.

Infant foods of the class to which the present invention relates include ordinarily large amounts of lactose, edible fat, and milk protein. A representative composition contains somewhat over half its total weight of lactose and approximately a fourth fat and an eighth protein in addition to various mineral, vitamin, and other enriching materials. The composition may be made by mixing the components with water, homogenizing, and then spray drying, some of the more sensitive components being added to advantage after the homogenization of the others and just before drying of the whole composition.

The present invention provides a process and apparatus for creating and drying crossed sprays of solutions of different viscosities.

Briefly stated, the invention comprises the herein described process and apparatus for codrying two solutions in the special manner described and the resulting product. More specifically, the invention comprises causing impingement of two merging or crossed streams of sprayed droplets in a current of drying gas such as warm air, the spraying being from nozzles in close proximity to each other so that the sprayed droplets from one of the plurality of streams impinge upon those of another stream before the exterior surfaces become dry. The invention comprises also the use of two solutions (true solutions or dispersions) or different viscosities in the plurality of nozzles so that the liquid of lower viscosity, when it impinges under conditions that are comparable except for viscosity differences upon a particle of higher viscosity, spreads preferentially over the particle of the higher viscosity and leaves finally its non-volatile material in higher proportion in the exterior coating in the finished dried particle than in the interior thereof. Other factors, if variable between the merging sprays, also affect the proportion of a given material at the outside and within the finished dried particle.

The invention will be further illustrated by description in connection with the attached drawings in which FIG. 1 is a side view partly in section of the spray drying equipment in the part thereof that is considered new.

FIGS. 2, 3, and 4 are similar views of modified forms of assemblies.

There are shown a duct 10 in which there is disposed approximately centrally the arrangement of the supply lines 12 and 14 for the dispersions to be sprayed through the plurality of nozzles 16, 18, 20, which together cause impingement of the sprayed droplets as illustrated at 22.

The assembly of nozzles 24 and 26, 28, 30, 32, and 34, with their supply lines 12 and 14, may be substituted in turn in place of the assembly inside the duct 10, in FIG. 1.

The figures are in part diagrammatic and parts of the spray drying equipment not shown are conventional. Such conventional parts not shown include (1) two systems including each a pump delivering under pressure the different dispersions that enter through the lines 12 and 14, (2) a drying chamber in which warm air contacts the sprays and causes drying, and (3) scraper and conveyor means for removing the spray dried product that settles in the drying chamber.

The materials of construction of the various parts of the equipment shown are those that are usual for parts of the same class in other spray drying equipment. Stainless steel is particularly satisfactory and is recommended when the product is to be used as a human food. We may use tinned iron or Monel metal, the tinned iron being not recommended because of shortness of life under the conditions of use and the Monel because of unnecessary expense.

The materials to be spray dried in making the infant food are, first, a dispersion of skim milk solids and edible fat supplied through one of the lines of the apparatus of the drawings as, for instance, through line 12. This dispersion may and ordinarily does include also considerable lactose as, for instance, about 160 parts of lactose to 100 of protein. This, however, may be varied widely and the added lactose may be omitted entirely from that line. The lactose solution supplied through line 14 ordinarily contains lactose in amount approximately 0.3–3 times the amount of protein in the whole composition. In this manner there is made a finished product in which there is some layering, with the quickly wettable lactose in higher concentration on the outside of the particle than within and with a ratio of total lactose to protein and fat ordinarily above that in a milk powder as, for example 45%–60% of the total.

The medium in which the dispersions are made is volatile and inert, i.e., non-reactive chemically with the materials dispersed therein. Water is the usual medium. When desired or necessary, other volatile liquid solvents may be used, as for example ethanol, isopropanol, acetone, ether, or ethyl acetate, in accordance with solubility of the materials to be dried to powder form.

In a modification of the invention, the dispersion supplied through line 12 is a dispersion of milk solids, either skim or whole and ordinarily skim milk solids as in a skim concentrate. It is advantageous here also to omit, from the milk solids, some of the normal content of lactose that is to appear in the finished product and to introduce the omitted portion separately through line 14. The several materials are supplied in total amounts to give a finished spray dried product of the approximate analysis of skim milk powder.

In place of the lactose, we may use other sugars, examples of which are sucrose, dextrose, maltose, and corn syrup solids, as may be most in demand in the various classes of products of this invention.

The fat introduced, as through line 12, may be butter fat, palm oil, cottonseed oil, soyabean oil, peanut oil, or mixtures thereof.

When it is desired to promote spreading of one of the sprayed liquids over the sprayed droplets of the other, rather than integral blending throughout coalesced droplets, the viscosity of one of the liquids sprayed is made substantially lower than the other, as by concentration, variation of its nature, or temperature of spraying, so that the said one liquid spreads faster, as, for instance, of viscosity in centipoises not more than 25%–75% of the liquid over which the less viscous droplets are to spread.

The operation of the process and apparatus is largely evident from the description that has been given. The sprayed plurality of materials impinge upon each other at a position sufficiently close to the orifices of the several nozzles, such as 1–15 inches, that the impingement occurs while the droplets of the one spray at least are moving at high velocity, each of the materials is in flowable condition as in dispersion or solution in water, and the exterior surfaces of the droplets are not dried to solid form. The high velocity of impingement causes spreading or filming of the most easily spreadable liquid over the other.

Thus we find that the solution of lactose, of lower viscosity than the dispersion of the other components of the infant food, deposits its lactose, during the drying of the crossed sprays, in greater proportion on the exterior part than in the interior of the final dried particle. The result is an exterior of the spray dried powder of high solubility and rate of wetting in water.

To cause impingement of the particles at high velocity, the pressure of spraying is high, suitably within the range of 200–1,000 p.s.i. although lower pressures may be used less satisfactorily, as down to 25 lbs. or so. Pressures above 1,000 p.s.i. are generally unnecessary.

The temperature of the dispersions (including solutions) sprayed may be varied from room up to the highest consistent with non-denaturing or decomposition of any material present, as up to 300° F. Usually we work at spray temperatures of about 150°–175° F., with inlet air to the drying chamber 250°–350° and outlet 160–225° F.

In one modification, one of the liquids is sprayed at pressures higher than the pressure of the other, as for example 100%–400% higher, so as to give a finer atomization of the first liquid and thus modify the proportions throughout the dried particles, or to offset, in rate of spraying, the higher viscosity of one of the solutions.

The invention will be further illustrated by detailed description in connection with the following specific examples of the practice of it.

*Example 1*

Concentrated skim milk of approximately 30% solids content 112 pounds, vegetable oil such as mixed palm, coconut, and peanut oils 27 pounds, lactose 18 pounds, and water 63 pounds are introduced into a jacketed mixing kettle, heated to 150° F. for 10 minutes, and homogenized in usual manner.

Additional lactose 18 pounds is dissolved separately in 54 pounds of water heated to 170° F.

The viscosity of the homogenized material was 14 cps. at 150° F. and of the lactose solution 2.5 cps. at 170° F.

The skim milk, vegetable oil, and lactose mixture is pumped at a temperature of 150° F. and a pressure of approximately 500 p.s.i. through line 12 to spray nozzle 18 (FIG. 1) and the separate lactose solution is pumped at a temperature of 170° F. and a pressure of approximately 150 p.s.i. through line 14 to spray nozzles 16 and 20. The nozzles 16 and 20, at their orifices, are about 16 inches apart and are inclined on their longitudinal axes at an angle of about 90° to each other and about 45° to the axis of 18 and are about 4 inches from 18. The merging spray patterns formed by the three spray nozzles are from the first in the current of air heated at approximately 310° F. at the inlet. This drying air enters through the duct 10 and moves around the nozzles and between the sprayed droplets from the moment of their formation, so as to initiate the drying at once. The air from 10 moves in the general direction of the merged sprays beyond point 22 and carries the droplets into a conventional drying chamber (not shown). The air falls in temperature to about 185° at the outlet end of the drying chamber. The dried powder that results falls to the bottom of the drying chamber and is removed therefrom.

The product dried by the above method is a granular powder. The lactose predominates in proportion in the exterior of the particles, as shown by improved rate of wetting on mixing the powder with water as compared to a like composition spray dried in usual manner. At least 90% of the contained lactose of the dried product is readily extractable with dimetyl formamide at 80° F. The extractability shows that substantially all of the lactose in the dried product is in the amorphous form.

*Example 2*

Skim milk is condensed to a solids content of approximately 45%, cooled to 88° F. and seeded with approximately 0.2% of alpha lactose crystals. It is held 1–2 hours with mild agitation. During this time, lactose crystallizes from the milk.

The lactose crystals so formed are then separated from the main portion of the milk as follows: Add cold water to the condensed milk with the crystals suspended therein, in the amount of 14% on the weight of the condensed milk used originally. Pump the suspension through a centrifuge, to remove the crystalline lactose.

The separated lactose, amounting to approximately 44% of the total lactose in the milk or 23% of the total milk solids, is then dissolved in water at 160° F. to a volume of one-third of the delactosed skim concentrate.

The delactosed skim milk concentrate is heated to 170° F. and pumped at a pressure of 500 p.s.i. through spray nozzle 18 and the lactose solution is pumped at the same time at a temperature of 160° F. through the spray nozzles 16 and 20. The merging spray patterns formed by the three nozzles converge and meet in a usual drying chamber (not shown) and are dried in a current of heated air entering the chamber through the duct 10 at approximately 310° F. The dried powder is continuously removed from the drying chamber, as in Example 1.

At least 90% of the contained lactose of the dried product is readily extractable with dimethyl formamide at 80° F.

*Example 3*

Fresh whole milk is separated at a temperature of 90° F. The cream so obtained is pasteurized, homogenized at 3,000 p.s.i., cooled and held for use as subsequently described . The skimmed milk is forewarmed in any conventional manner, condensed by evaporation to 45% solids and cooled to 88° F. It is then seeded with coarse alpha lactose crystals and the resulting mixture is held for 1–2 hours with mild agitation. The lactose crystals that result are separated from the milk in the following manner: Add 125 parts of cold water for 100 parts of condensed milk, to lower the solids content to 20%. This reduces the viscosity and permits the lactose crystals to settle so that most of the fluid can be and is then separated by decantation. The decanted fluid is again condensed to 45% solids, cooled to 88° F., seeded, and the separation repeated.

The cream and the delactosed skim milk are combined, to form delactosed whole milk concentrate. The separated lactose is dissolved in water at 160° F. to a volume one-third that of the delactosed whole milk concentrate.

The delactosed whole milk concentrate is heated to 170° F. and pumped at a pressure of 500 p.s.i. to spray nozzle 18 and the lactose solution is pumped at a temperature of 160° F. to spray nozzles 16 and 20, as illustrated in the drawings. The merging spray pattern formed by the three nozzles spray the two liquids simultaneously into a drying chamber. They are dried in a current of air heated to 310° F. The dried powder is continuously removed from the drying chamber.

*Example 4*

The procedures of Examples 1, 2 and 3 are used except that the assemblies shown in FIGS. 2, 3 and 4 are substituted in turn for the assembly of FIG. 1.

*Example 5*

The procedures of Examples 1, 2, 3 and 4 are followed in turn except that the lines through which the various materials are introduced are interchanged so that the aqueous solution of the lactose is introduced through line 12 in the assembly of each of the figures and the other aqueous dispersion through line 14.

*Example 6*

The procedures of any of the Examples 1–5 is used except that the lactose solution there described is replaced by a solution of any of the other sugars named herein.

Example 7

The procedure of Example 1 is followed except that the protein, fat and lactose composition referred to as the "mixture" is further compounded with fortifying materials, vitamins, and other beneficiating components described and in the proportions shown in Patent 2,659,676, issued to Hartley W. Howard and Julius F. Muller on November 17, 1953. Thus the whole formula is that shown below. All components are sprayed in aqueous dispersion through nozzle 18 except the "lactose added as such" which is supplied in solution through nozzles 16 and 20.

| Ingredient: | Percent in food |
|---|---|
| Skim milk (condensed to 21 to 26.5% solids) | 33.2 |
| Lactose added as such through nozzle 12 | 38.4 |
| Palm oil | 13.2 |
| Coconut oil | 6.6 |
| Peanut oil | 6.6 |
| Lecithin | 1.0 |
| Calcium chloride | 0.55 |
| Potassium hydroxide | 0.22 |
| Methionine | 0.15 |
| Ferrous sulfate | 0.03 |
| Ascorbic acid | 0.04 |
| Niacin | 0.005 |
| Thiamine hydrochloride | 0.0003 |
| Riboflavin | 0.0002 |
| Vitamins A and D oil concentrate | 0.0045 |
| | 100.0000 |

It is to be understood that it is intended to cover all changes and modifications of the examples of the invention herein chosen for the purpose of illustration which do not constitute departures from the spirit and scope of the invention.

We claim:

1. In spray drying, the process which comprises forming converging sprays of droplets of two different miscible solutions of fluid dairy products, one of which has a viscosity not more than 75% of that of the other solution, at such proximity and at such angle of convergence to each other that the sprays impinge under the force of spraying before the sprayed particles become dried over their exterior surfaces, and maintaining the merged droplets in suspension in a current of a drying gas until the droplets are dried.

2. In spray drying an aqueous dispersion of a dairy product and an aqueous solution of a sugar by forming converging separate sprays of said dispersion and said solution and maintaining the resulting merged droplets in suspension in heated air until dried, the improvement comprising converging said separate sprays in a current of heated air within an enclosed zone, said solution as sprayed being of viscosity substantially below that of said dispersion.

3. In spray drying an aqueous dispersion of a dairy product and an aqueous solution of a sugar by forming converging separate sprays of said dispersion and said solution and maintaining the resulting merged droplets in suspension in heated air until dried, the improvement comprising converging said separate sprays in a current of heated air within an enclosed zone, said solution as sprayed being of viscosity substantially below that of said dispersion, said dairy product being milk solids and said sugar solution being lactose.

4. The process of claim 1 which includes effecting said spraying of the more viscous of said solutions at a pressure 100%–400% higher than the pressure of spraying of the other solution.

References Cited in the file of this patent

UNITED STATES PATENTS

| 1,174,592 | Lobeck | Mar. 7, 1916 |
| 2,353,459 | Gruber | July 11, 1944 |
| 2,659,676 | Howard et al. | Nov. 17, 1953 |
| 2,893,871 | Griffin | July 7, 1959 |